Aug. 31, 1965 F. W. FROMM ETAL 3,204,083
LOW HEAT PLUG WELD METHOD AND APPARATUS
Filed March 25, 1963

Inventors
FREDERICK W. FROMM
ROBERT H. KILPATRICK
By

*George C. Sullivan*

Agent 3,204,083
LOW HEAT PLUG WELD METHOD AND
APPARATUS
Frederick W. Fromm, Dunwoody, and Robert H. Kilpatrick, Smyrna, Ga., assignors to Lockheed Aircraft Corporation, Burbank, Calif.
Filed Mar. 25, 1963, Ser. No. 267,575
7 Claims. (Cl. 219—127)

This disclosure relates to method and apparatus for welding one element to another without heat distortion, and more particularly to a method and apparatus for welding locator brackets to a jig.

Assembly and inspection jigs are widely used in industry for the manufacture and inspection of complex members of critical form and dimension and great care is exercised in the manufacture of such jigs since inaccuracies in the jig are amplified in the end product. Several methods are presently employed in the manufacture of jigs, and of these the most widely used is that of securing locator brackets to a jig structure by machine bolts, a tedious and time-consuming operation principally because of the close tolerances required to be maintained. Because of the substantial time saving realized by the use of welding in jig buildup manufacture, various attempts have heretofore been made to adopt conventional welding techniques to the manufacture of jigs. Conventional welding techniques have been found to be unsuitable for jig manufacture, however, because the heat generated in normal welding processes expands and distorts the metal, thereby introducing inaccuracies into the jig configuration for the metal upon cooling does not take its original shape. These problems have been solved by this invention by providing a method and apparatus for jig buildup wherein locator brackets are welded to a jig structure with insignificant heat distortion.

Accordingly, it is an object of this invention to provide a method and apparatus for building up jig structure to close tolerance by welding with insignificant heat distortion of the jig.

Another object of this invention is to provide a relatively easy and inexpensive way to build up a jig structure by welding while maintaining a minimum of heat distortion of the jig.

Yet another object of this invention is to provide a method and apparatus for securing one element to another by welding with insignificant heat distortion in such a manner as to provide a maximum weld nugget diameter.

A further object of this invention is to provide a method and apparatus for generating heat only at the interface of the elements being welded.

Further objects and advantages of this invention will become apparent from the following description taken in connection with the accompanying drawings in which.

Generally stated, this invention comprises a method and apparatus for welding one element to another with insignificant heat distortion of the parts. In this method, a surge of current is applied to the welding electrode upon initiation of the welding process and the feed rate of the electrode is very high to decrease to a minimum the time required for welding. Also, the weld hole is particularly designed to be wide at the top and have a flange at the bottom thereof to prevent initiation of an arc between the electrode and the weld hole at other than the interface of the materials to be joined. The flange is particularly designed to melt during the welding process to increase the weld nugget diameter size.

Figure 1:
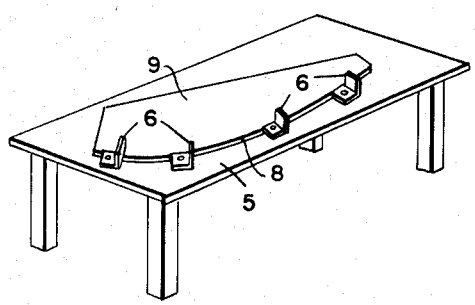
FIGURE 1 is a pictorial view showing one typical type of jig having locator brackets secured thereto in accordance with this invention.
Figure 2:
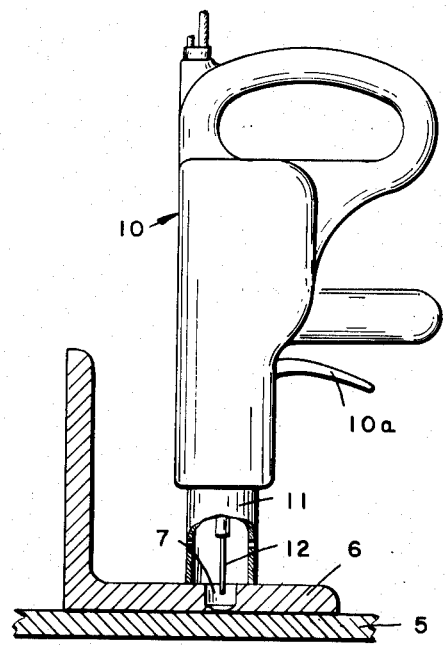
FIGURE 2 is a partially sectional view showing a welding gun in operating position with respect to a plug weld hole formed in a locator bracket.

More specifically, there is shown in FIGURES 1 and 2 a jig structure or layout table 5 to which locator brackets 6 having plug weld holes 7 therein are secured by welding. The locator brackets 6 are shown as being positioned relative to one another so as to outline a design contour whereby the edge 8 of each of several parts 9 may be manufactured to this contour and checked for conformance to the contour.

Figure 3:
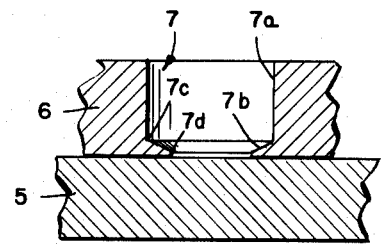
FIGURE 3 is a cross-sectional view showing the details of the plug weld hole prior to welding.
Figure 4:
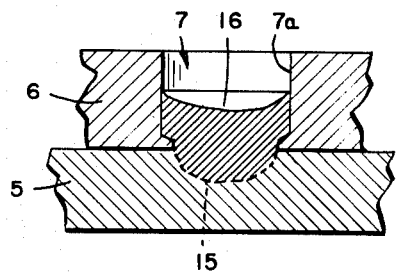
FIGURE 4 is a cross-sectional view showing the details of the plug weld hole after welding.

More specifically with respect to FIGURES 2, 3 and 4, therein shown is a partial sectional view of the details of plug weld hole 7. The design of plug weld hole 7 is critical to this invention and comprises the counter bore 7a and the flange 7b at the bottom of the plug weld hole. The flange 7b is preferably tapered from its butt end 7c to its terminal end 7d to increase the area through which structural loads may be transmitted between the locator bracket 6 and the jig structure 5. Also, the tapered terminal end 7d of the flange 7b is sufficiently thin to permit its entering into the weld melt. Welding of the locator bracket 6 to the jig structure 5 is effected by use of a commercially available consumable electrode fusion spot weld gun 10 having an operating trigger 10a, a weld cup 11 for permitting welding in an inert atmosphere (if desired), and a consumable electrode 12 which is fed into the weld hole and enters in the weld melt.

In operation, the fusion spot weld gun 10 is positioned with the cup 11 in covering relation to the plug weld hole 7 and the trigger 10a thereof is depressed such that the electrode wire 12 runs into the plug weld hole at a slow rate of speed in the order of 42 inches per minute, for example. The counter bore 7a of the weld hole 7 is constructed to be of sufficient diameter so that a welding arc will not be initiated between the electrode 12 and the surface of counter bore 7a during run-in of the electrode 12 to prevent heating of the locator bracket 6 in that area. At the time the electrode 12 approaches the interface between locator bracket 6 and jig structure 5, an arc is initiated between the electrode 12 and the flange 7b and/or the jig structure 5 which serves as a ground for the welding circuit. Upon initiation of the welding arc, the welding wire speed is increased in a controlled manner to a high rate of speed in the order of 300 inches per minute, for example, and a surge of current is applied to the electrode 12.

In the welding operation, melting of the jig structure 5 confronting the plug weld hole 7, the terminal end 7c of flange 7b, and the electrode 12 is effected to form a weld melt and a resultant weld nugget the bottom of which is defined by the dotted line 15 in FIGURE 4 thereby welding the locator bracket 6 to the jig structure 5. During welding, electrode filler metal is deposited in the plug weld hole 7 up to weld surface 16. For attainment of maximum tensile strength in the weld and to prevent the weld nugget from pulling out of the plug weld hole 7, surface 16 preferably lies above the interface of the plug weld hole and the jig structure 5 in the order of one-half the diameter of the weld nugget at the interface. Welding may or may not take place between the electrode metal and the portion of the flange which does not enter into the weld melt or the surface of counter bore 7a; however, welding in these areas is not essential as will more clearly appear. Once welding is effected, the spot weld gun 10 is removed and the process is complete.

In further explanation of the present welding method, the advantages obtained thereby over known prior art plug welding methods will be described. If a straight plug weld hole is utilized having sufficient diameter to prevent the initiation of an arc between the electrode and the plug hole side wall, welding between the electrode material and the structure to which welding is being effected will take place; however, mechanical bonding as opposed to quality welding will take place between the electrode material and the straight plug hole side wall. Mechanical bonding, as is obtained by the use of a large straight plug weld hole, may be sufficient for some applications; however, the high strength and rigidity required in some jig structures dictates the use of stronger joining methods. Where a large straight plug weld hole is used, welding between the electrode material and the plug weld hole side wall could be accomplished by increasing the welding power which in turn increases the heating of the members being joined so as to cause excessive or unacceptable heat distortion. Also, a welding electrode has heretofore been traversed around the periphery of a plug weld hole at the interface to obtain welding to the plug hole side wall and the structures being joined. This method, it will be appreciated, is unsatisfactory due to the possibility of human error in the welding process and a consequent lack of control over the welding process.

In contrast, in the subject invention, the flange 7b provided at the bottom of the plug hole 7 decreases the diameter of the plug weld hole at the interface so that welding will not take place during run-in of the electrode 12. Moreover, the flange 7b is constructed of such a thickness that the terminal end 7d thereof is melted during the welding process and becomes a part of the weld melt thereby increasing the weld nugget diameter and obtaining welding between the plug weld hole side wall at the flange 7b and the jig structure 5. Welding may not occur above the flange because of the increased diameter of the plug hole; however, such is not necessary because failure occurs at the interface in shear and in torsion, while conical failure results from tension loading of the weld. In conical failure the base of the cone is located at the intersection of the weld nugget and the interface, with the apex of the cone normally being located in the weld filler material in the plug hole. For best results, the apex of the cone should be below the filler material surface; and although the angle of the cone is a function of the lattice structure of the electrode metal, the height of the cone will be approximately equal to one-half the diameter of the base of the cone. To confine conical failure within the weld nugget, electrode filler material is built up in plug weld hole 7 above the interface a distance in the order of one-half the diameter of the weld nugget at the interface.

It will be seen from the above that the welding method and apparatus of this invention provides for the economical construction of jigs without heat distortion which would render the jig unacceptable for use in the manufacture of parts to close tolerance. Also, it will be seen that the provision of a plug weld hole having a flange which enters into the weld is a feature most desirable in this welding process for it permits the flange to enter into the weld melt thereby increasing the strength of the weld without excessive heating being required. It should be noted that a flange of 3/16-inch length and 1/32-inch mean depth when used with a 1/2-inch diameter plug weld has been found to provide an excellent weld with no appreciable heat distortion. It is to be understood that these dimensions are by way of illustration of an acceptable relationship of the plug weld hole dimensions, and it is to be understood that such illustrative dimensions may be reasonably varied without detriment to the weld quality and/or strength, and that such dimensions are in no way intended to limit the scope of this invention.

While a particular embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. In a member having a pair of opposed surfaces a plug weld hole extending through said member between said surfaces for permitting welding of said member to another member, said plug weld hole having a first cross-sectional area intersecting the first surface of said member, and a flange proximate the other surface of said member forming a reduced cross-sectional area of the plug weld hole thereat with respect to said first cross-sectional area.

2. The plug weld hole of claim 1 wherein said flange is tapered to be thinnest at its radially interior end and thickest at its radially exterior end.

3. In a member having a pair of opposed surfaces a plug weld hole extending through said member between said surfaces for permitting welding of said member to another member, said plug weld hole having a first diameter at its intersection with the first surface of said member, and a flange proximate the other surface of said member forming a reduced diameter of the plug weld hole thereat with respect to said first diameter.

4. A method of welding one heat weldable member to another comprising the steps of: forming in one member a plug weld hole with an annular flange at the bottom thereof; positioning the said one member on the other with the flange in confronting relation thereto; striking a welding arc at the bottom of the hole to melt the terminal end of the flange and the confronting other said member; and filling at least some of the hole above the flange with weld filler material.

5. A method of securing a first weldable member to a second heat weldable member comprising the steps of: forming a plug weld hole in said first member with a flange at the bottom of the hole; positioning said first member on said second member with the bottom of the hole in confronting relation to said second member; initiating an arc at the bottom of the hole to melt the terminal end of the flange and the confronting second member; and filling the hole with weld filler material above the interface of said first and second members a distance in the order of one-half the diameter of the weld nugget at the interface.

6. A method of securing a first weldable member to a second heat weldable member comprising the steps of: forming in said first member at least one plug weld hole with an annular flange at the bottom thereof; mounting said first member on said second member with the flange in confronting relation to the second member; initiating a welding arc in the hole at the bottom thereof so as to melt the tip of the flange, and feeding welding wire into the hole in covering relation to the flange.

7. A method of securing a first heat weldable member to a second heat weldable member comprising the steps of: forming in said first member at least one plug weld hole having a flange at the bottom thereof; positioning said first member on the second with the bottom of the hole in confronting relation to the second member; positioning a fusion spot weld gun in covering relation to the hole; and feeding electrode wire into the hole for effecting welding between the terminal end of the flange and the confronting second member.

References Cited by the Examiner

UNITED STATES PATENTS 2,860,230  11/58  Rapasky _____ 219—94

RICHARD M. WOOD, *Primary Examiner.*